(12) United States Patent
Haridas et al.

(10) Patent No.: US 11,956,339 B2
(45) Date of Patent: Apr. 9, 2024

(54) MULTIPLE NETWORK REDUNDANCY PROTOCOLS FOR DATA FLOW USING THE SAME PHYSICAL INTERFACE

(71) Applicant: Honeywell International Inc., Morris Plains, NJ (US)

(72) Inventors: Harshal S. Haridas, Jamison, PA (US); Joseph Pradeep Felix, Phoenixville, PA (US); Jay William Gustin, Scottsdale, AZ (US); Paul Francis Mclaughlin, Ambler, PA (US); Jason Thomas Urso, Houston, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 207 days.

(21) Appl. No.: 17/139,716

(22) Filed: Dec. 31, 2020

(65) Prior Publication Data
US 2022/0210252 A1 Jun. 30, 2022

(51) Int. Cl.
*G06F 15/16* (2006.01)
*G05B 15/02* (2006.01)
*H04L 9/40* (2022.01)
*H04L 69/40* (2022.01)

(52) U.S. Cl.
CPC .............. *H04L 69/40* (2013.01); *G05B 15/02* (2013.01); *H04L 63/0428* (2013.01)

(58) Field of Classification Search
CPC ...... H04L 69/40; H04L 63/0428; G05B 15/02
See application file for complete search history.

(56) References Cited

U.S. PATENT DOCUMENTS

| | | | | |
|---|---|---|---|---|
| 9,361,247 | B1* | 6/2016 | Kumar Kn | G06F 13/20 |
| 9,438,628 | B2* | 9/2016 | Haridas | H04L 63/20 |
| 9,450,916 | B2* | 9/2016 | Gustin | H04L 63/0227 |
| 9,973,447 | B2* | 5/2018 | Liang | G06F 11/202 |
| 10,587,421 | B2* | 3/2020 | Hojsik | H04L 9/3263 |

(Continued)

OTHER PUBLICATIONS

ControlNet to Ethernet/IP Migration, Reference Manual, Rockwell Automation Publication CNET-RM001A-EN-P-Dec. 2019, 30 pages (Year: 2019).*

(Continued)

*Primary Examiner* — Oleg Survillo
(74) *Attorney, Agent, or Firm* — Stevens & Lee PC; John Maldjian, Esq.

(57) ABSTRACT

A process control system (PCS) includes a cable connection including physical cables including a first cable for connecting between a process controller and an I/O access device, and an independent second cable for connecting the process controller and a second node being the I/O access device or another device. The I/O access device is for coupling to I/O module(s) to receive an output of the I/O access device. An output of the I/O module is coupled to a field device coupled to processing equipment. The process controller and I/O access device each include a processor and memory that implement send and receive logic for communicating using any of multiple redundancy protocols including a first and a second redundant protocol. The cable connection is for supporting simultaneously communicating between the process controller and the second node utilizing both the first redundant protocol and the second redundant protocol.

20 Claims, 5 Drawing Sheets

(56) References Cited

U.S. PATENT DOCUMENTS

| | | | |
|---|---|---|---|
| 2008/0239946 A1* | 10/2008 | Morita | H04L 43/0817 370/254 |
| 2009/0060192 A1* | 3/2009 | Budampati | H04W 12/03 380/278 |
| 2009/0295571 A1* | 12/2009 | Hosey | G08B 29/16 340/540 |
| 2010/0042848 A1* | 2/2010 | Rosener | G06F 21/34 726/19 |
| 2012/0170449 A1* | 7/2012 | Nakash | H04L 45/28 370/216 |
| 2013/0173024 A1 | 7/2013 | Pettigrew et al. | |
| 2016/0036626 A1* | 2/2016 | Bale | H04L 41/0663 370/242 |
| 2016/0057045 A1* | 2/2016 | Gustin | H04L 12/40176 370/254 |
| 2017/0026349 A1* | 1/2017 | Smith | H04L 45/38 |
| 2017/0093583 A1* | 3/2017 | Ohara | H04L 63/0823 |
| 2020/0033840 A1* | 1/2020 | Balasubramanian | H04L 49/552 |
| 2020/0396912 A1* | 12/2020 | Stouffer | E04H 12/344 |
| 2021/0152495 A1* | 5/2021 | Craig | H04L 43/20 |
| 2022/0100165 A1* | 3/2022 | Neet | G06F 11/3024 |
| 2022/0182182 A1* | 6/2022 | Zha | H04L 1/22 |

OTHER PUBLICATIONS

Extended European Search Report dated May 11, 2022; issued in connection with corresponding EP Application No. 21216741.5 (11 pages total).

* cited by examiner

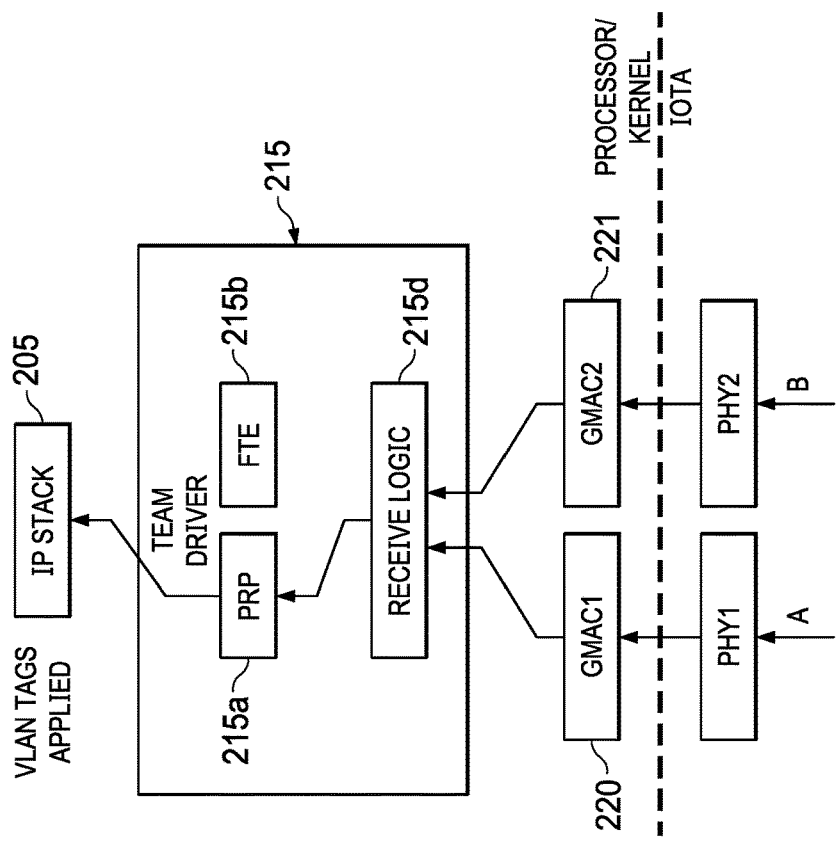
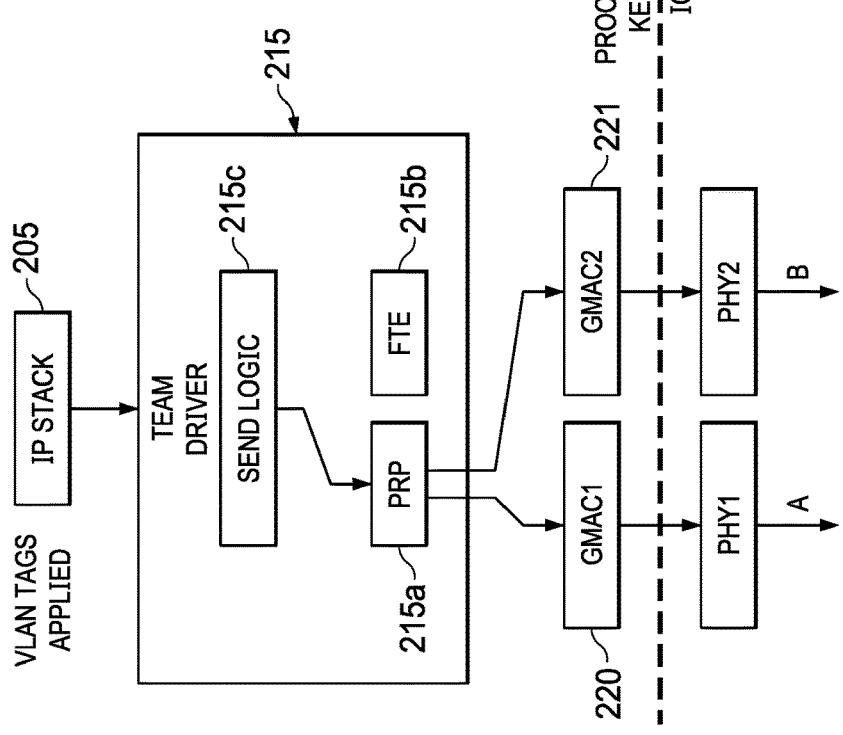

MULTIPLE NETWORK REDUNDANCY PROTOCOLS FOR DATA FLOW USING THE SAME PHYSICAL INTERFACE

FIELD

Disclosed aspects relate to cabling arrangements in networks that implement multiple redundancy protocols for a process control system (PCS).

BACKGROUND

Industrial control systems (ICS), also known as process control systems (PCSs) adopted the IEEE 802.3 Ethernet in the middle to late 1990s in a shift for increased bandwidth, full duplex capability, and improved connectivity to transfer more data, improve productivity and help reduce costs. Adopting these standards further allowed systems to grow and become more distributed. While PCS are employing an increasing number of Ethernet-based networked data flows, the same or a better level of fault tolerance is expected as compared to smaller and closed proprietary coaxial cable-based network deployments. A more recent trend of critical data flow (Controller to input/output input/output (I/O) communications) in a PCS has moved to Ethernet networks with the I/O modules now accessed from anywhere within the PCS.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize the problem of process controller to I/O module communications due to its criticality and application in PCS deployments imposes stringent requirements to quickly recover once a fault condition is sensed. As result, the nodes participating in controller-PO module communications provide multiple connectivity interfaces, and vendors for the associated control system equipment use multiple architectural connectivity interfaces and architectural connectivity patterns to meet these stringent fault tolerance requirements. A conventional PCS implementation in the field for this purpose uses separate physical networks for I/O module deployment and direct IO module access from process controllers, where the process controllers each have a dedicated IO module.

For disclosed aspects process controller access to the I/O module(s) is indirect through what is referred to herein as an "I/O access device", such as the I/O access device comprising a gateway device or interface module, so that the disclosed communications between the process controller and the I/O module(s) goes through the I/O access device. An I/O access device as used herein is any network equipment device type or system type that allows communication access between I/O modules and process controllers. Network availability and fault tolerance protocols, are for example tree/star networks such as parallel redundancy protocol (PRP), and for example ring networks such as High-availability Seamless Redundancy (HSR) or Media Redundancy Protocol (MRP) which are applied on these separate physical networks that are used for accessing the I/O modules for providing a faster fault recovery.

For non-controller-PO related communication in PCS, because this type of communication generally does not need fast fault recovery, such communications may use nodes with single interface connectivity, that have a high level of bandwidth needs (backups and archiving), or may have requirements for high network availability with relatively less stringent fault condition recovery needs (e.g., process view, alarming and events). These needs are generally met by using multiple paths (or lanes) with fault tolerance schemes including network interface card (NIC) teaming, fault-tolerant Ethernet (FTE), or a Device level Ring (DLR). A network redundancy protocol such as FTE provides four paths for a two-connection interface (or port) node, and two paths for a single-connection interface node, where only one path is used at any given time. For ring networks, a network redundancy protocol such as DLR provides high network availability for less stringent fault condition recovery needs (e.g., configuration, firmware updates).

When a PCS deploys such connectivity nodes to meet differing bandwidth and fault tolerant recovery rates for data flows using separate network segments, disclosed aspects recognize a problem of increased complexity and cost being introduced in several areas including in configuration, asset management, security, and time distribution. Disclosed aspects provide a solution to solve the complexities introduced for multiple PCS functions (e.g., configuration, security, time distribution, and asset management) by using more than one network redundancy protocol on two separate (independent) physical cables. The implementation of the two or more redundancy protocols can each collectively utilize both of the cables, with a first redundant protocol being a fault-tolerant ethernet protocol which means a network that will not fail because of a single component/cable failure, for example FTE, and a second redundant protocol being PRP each utilizing the same two physical cables. The first redundant protocol and the second redundant protocol both have different fault recovery rate capabilities.

One disclosed aspect comprises a PCS that includes a cable connection including physical cables including a first cable for connecting between a process controller and an I/O access device, and an independent second cable for connecting the process controller and a second node being the I/O access device or another device. The I/O access device is for coupling to I/O module(s) to receive an output of the I/O access device. An output of the I/O module is coupled to field devices (e.g., sensors and actuators) that are coupled to processing equipment. The process controller and the I/O access device each include a processor and memory that implements send and receive logic (e.g., using code or hardware logic such as a field programmable gate array (FPGA)) for communicating using any of multiple redundancy protocols including a first and a second redundant protocol. The send and receive logic is for configuring the cable connection for supporting simultaneously communicating between the process controller and the second node utilizing both the first redundant protocol and the second redundant protocol.

BRIEF DESCRIPTION OF THE DRAWINGS

FIG. 2 depicts packet handling (sends) in a non-ringed network for critical traffic, according to an example aspect.

FIG. 3 depicts packet handing (receives) in a non-ringed network for critical traffic, according to an example aspect.

DETAILED DESCRIPTION

Figure 1A:
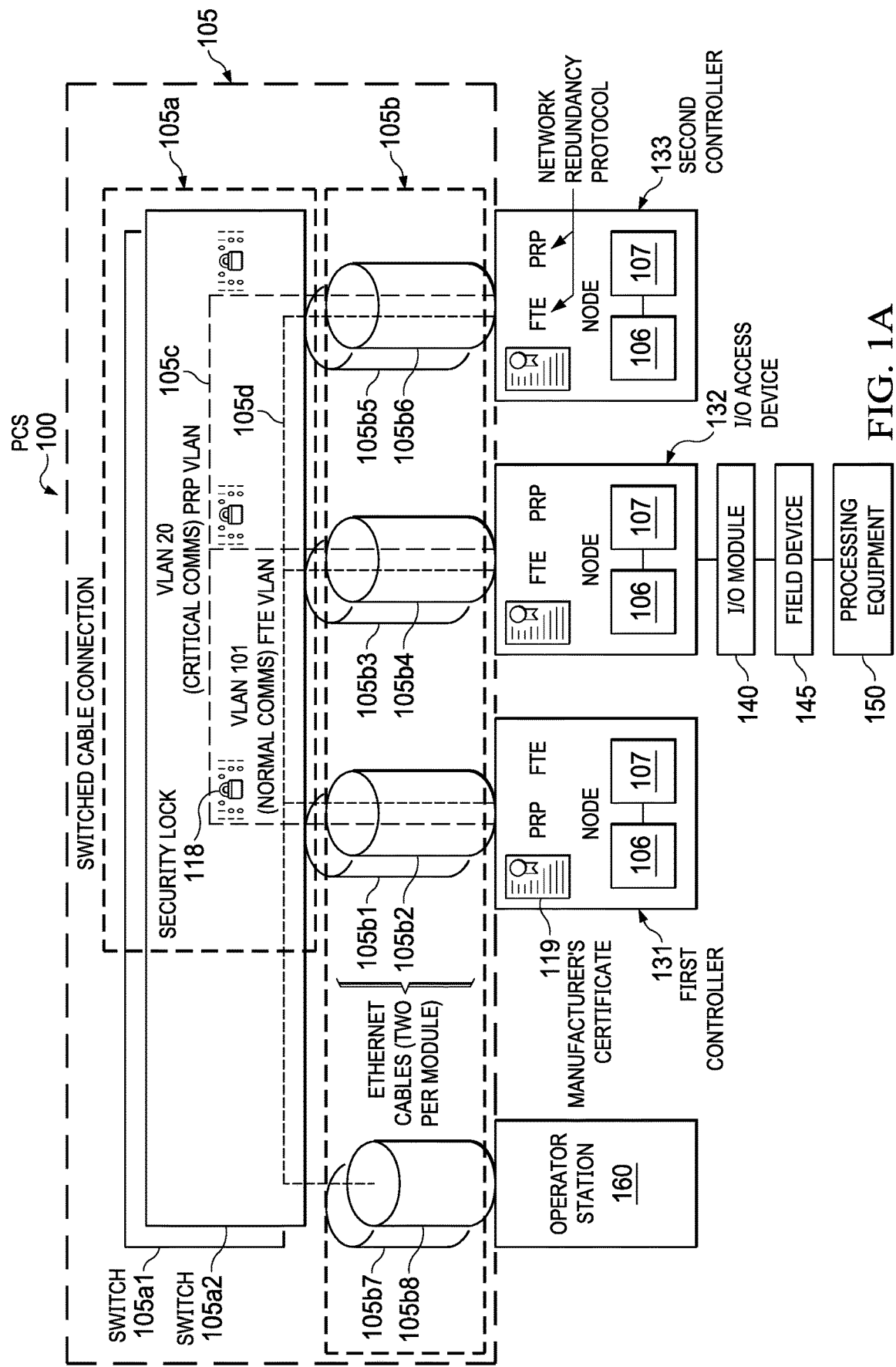
FIG. 1A depicts a PCS comprising a communication network including a disclosed switched cable connection configured for use in a non-ringed network that provides multiple network redundancy protocols on the same physical interface for data flows shown between a plurality of nodes shown as a first process controller, an I/O access device, a second process controller, according to an example aspect.

Disclosed aspects are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed aspects.

As used herein a PCS runs an industrial process involving a tangible material that disclosed aspects apply. For example, oil and gas, chemical, beverage, pharmaceutical, pulp and paper manufacturing, petroleum processes, electrical power including renewable energy, and water. A PCS is thus distinct from a data processing system that only performs data manipulations.

FIG. 1A depicts a PCS 100 comprising a communication network including a disclosed switched cable connection 105 comprising a plurality of switches 105a coupled to a plurality of physical cables 105b, where the switched cable connection 105 is configured for use in a non-ringed network that provides multiple network redundancy protocols on the same physical interface (cables) for data flows shown between a plurality of nodes (also known as network devices). The plurality of nodes is shown as a first controller 131 and a second node shown as an I/O access device 132 that can also be another device type such as another controller, and another (third) node shown by example as being a second controller 133. The I/O access device 132 can comprise an interface module or gateway device. As used herein a gateway or interface module is networking hardware used to allow data to flow from one discrete network to another. The I/O access device 132 is connected to at least one I/O module 140, that is connected to a plurality of field devices 145, which are connected to provide control and sensing for a plurality of instances of processing equipment 150.

The positioning of the I/O access device 132 between process controllers shown in FIG. 1A as the first process controller 131 and the second process controller 133 and the I/O module(s) 140, is in contrast to the arrangement in a conventional PCS where the process controllers are directly coupled to the I/O modules, such as by a dedicated cable connection. The I/O modules 140 generally include a plurality of channels for communications, such as having 2 channels to 32 channels. The I/O modules 140 are coupled to field devices 145. The field devices 145 generally comprise sensors, actuators, and valves, which are coupled to processing equipment 150. The processing equipment 150 can comprise various equipment including for example burners, furnaces, or mixers.

The plurality of switches 105b are shown comprising switches shown as 105a1 and 105a2, such as comprising CISCO switches, and the physical cables 105b are shown in FIG. 1A as Ethernet cable pairs (two cables per cable pair) comprising a first cable pair 105b1/105b2, a second cable pair 105b3/105b4, a third cable pair 105b5/b6, and a fourth cable pair 105b7/b8. The first, second, third and fourth cable pairs respectively connect on a first end to the first controller 131, the I/O access device 132, the second controller 133 and the operator station 160. The second end of the first cable pair pairs 105b1/105b2, second cable pair 105b3/105b4, third cable pair 105b5/b6 and a fourth cable pair 105b7/b8 are connected to the plurality of switches 105a.

The first controller 131, the I/O access device 132, the second controller 133 and plurality of switches at 105a each implement two VLANs shown as separate virtual local area networks (VLANs), shown as VLAN20 (for critical communications) and VLAN 101 (for what is termed normal communications) for simultaneous communications taking place in the communications network. The operator Station 160 implements one VLAN shown as separate virtual local area networks (VLANs), shown as VLAN 101 (for what is termed normal communications).

A VLAN is defined herein as it is conventionally defined to be any broadcast domain that is partitioned and isolated in a computer network at the data link layer (open systems interconnection (OSI) layer 2). Disclosed cable connections, when they are switched cable connections such as the switched cable connection 105 shown in FIG. 1A, provide cable sharing between a plurality of nodes as opposed to having conventional dedicated cables between the nodes in the PCS.

Disclosed aspects facilitate implementation of certain value-added features because of the separation of networks that is noted above can be implemented in software or using hardware logic devices such as by a FPGA or application-specific integrated circuits (ASIC) implementations in lieu of hardware-physical cables. The security lock 118, shown within plurality of switches 105a in FIG. 1A, indicates the link and communication on the link is secured through the use of authentication and data encryption. The security lock feature is disclosed in U.S. Pat. No. 9,438,628, which is assigned to Honeywell International, as is his application. The certificate symbol 119 shown in FIG. 1A with each of the nodes comprising first controller 131, I/O access device 132, and second controller 133, indicates that the node has a manufacturer certificate to enable proving its authenticity. This feature is disclosed in U.S. Pat. No. 10,587,421 also assigned to Honeywell International Although FIG. 1A is described as including a first process controller 131, I/O access device 132, and a second process controller 133, each of the network nodes can more generally each comprise a process controller, or an I/O access device.

The separate VLAN 20 and VLAN 101 implemented by the switched cable connection 105 functions to segregate data communications for different data flows. The plurality of switches 105a can be based on IEEE Standard 802.3. Although there are two VLANs shown in FIG. 1A, there can optionally be three or more VLANs on the same two cables. The respective VLANs are shown as VLAN 20 for what is considered critical communications which need a fast recovery under faults to function properly, and VLAN 101 for normal communications which can properly function using relatively high level of bandwidth as the communications can tolerate slower recovery in the case of faults.

Critical communications in a PCS can include communications to operate power substations, synchronized drives, valves, and actuators. Normal communications can comprise communications involved in ensuring a normal plant operation including the monitoring of PCS health, process controllers, alarms, and events.

A first and second VLAN is implemented over each cable pairs 105*b*1/*b*2, 105*b*3/*b*4, and 105*b*5/*b*6 each comprising two independent physical cables by utilizing FTE and/or PRP as underlying example network redundancy protocols. FTE is known to be a topology having two parallel tree hierarchies of switches, connected at the top by one crossover cable to form one fault tolerant network. In the case of FTE, although there are redundant paths, only one path is used for any given packet at any given time. PRP follows an approach of using two independent parallel tree hierarchies of switches, not connected to each other to form one fault tolerant network, where PRP is an example of a second redundancy mechanism. PRP uses both paths simultaneously. LAN in this VLAN context virtual refers to a physical object recreated and altered by additional logic. Disclosed segregating of data flows across different VLANs enables the use of multiple network level redundancy capabilities (FTE and PRP) to achieve the benefits described in Table 1 described below.

In FIG. 1A, the two VLANs (shown as VLAN 20 and VLAN 101) carry data traffic, generally in the form of data packets, with different criticalities. VLAN 20 provides essentially immediate recovery upon faults as compared to VLAN 101, where in FIG. 1A VLAN 20 is for carrying critical communications traffic using PRP, where VLAN 101 as shown in FIG. 1A provides a relatively lower criticality or a higher level of bandwidth for carrying normal communications traffic using FTE VLAN.

Each node shown in FIG. 1A as first controller 131, I/O access device 132, and second controller 133, has a processor 106 that provides the function of process controller, such as a central processing unit (CPU), microcontroller, or other processing device, and a user configuration stored in a memory 107 associated with the processor 106. The first controller 131, second controller 133, and the I/O access device 132 each implement send and receive logic for communicating using any of the multiple redundancy protocols. The send and receive logic can be implemented by code stored in the memory 107, or by the processor 106 by including a hardware logic device.

Programming in one arrangement can be Honeywell International provided logic for these nodes comprising the first controller 131, I/O access device 132, and the second controller 133. The programming in the case of FTE, being one of the redundant protocols where FTE as a redundancy protocol is a communication language, and the FTE device index is identification of a node to enable talking FTE communication language, includes the FTE device index that in one arrangement may have a validity range 1 to 999. Likewise, the VLAN IDs shown herein are used only as examples, being in FIG. 1A are VLAN 20 and VLAN 101. Valid ranges for programming the tag representations sometimes referred to herein as VLAN IDs in one arrangement for a 12-bit representation may be 1 to 4095, along with VLAN policies.

The plurality of switches 105*a* can comprise high-speed switches, such as each comprising a Cisco switch. The plurality of switches 105*a* are not generally controlled by any device or system. But are rather each independently configured at a single time to pass packets/data from one node to another node.

Figure 1B:
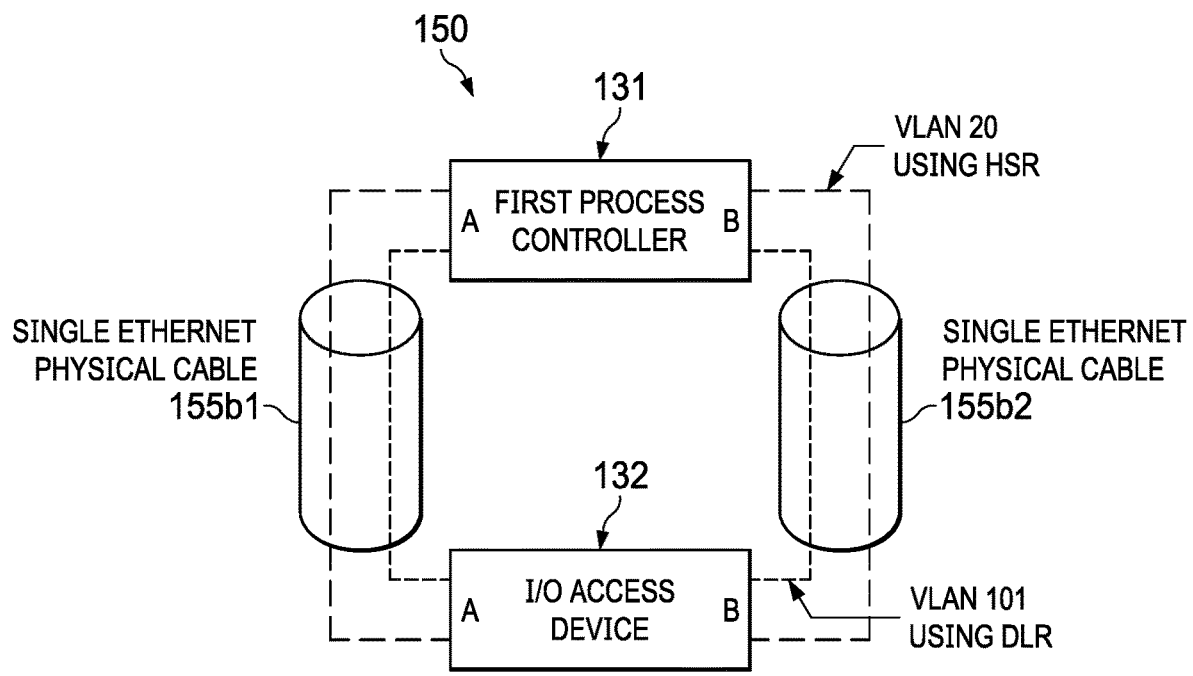
FIG. 1B depicts a disclosed cable connection configured for use in a ringed network that provides multiple network redundancy protocols on the same physical interface for data flows shown between a plurality of nodes shown as a first process controller and an I/O access device, according to an example aspect.

FIG. 1B depicts a disclosed cable connection 150 configured in a ringed network with a portion shown that provides multiple network redundancy protocols on the same physical interface for data flows shown between a plurality of nodes shown as a first process controller 131 and an I/O access device 132, according to an example aspect. There are two instances of a single Ethernet physical cable shown as 155*b*1 and 155*b*2 between the first process controller 131 and I/O access device 132, with the cable connection 150 shown supporting two different protocols shown as VLAN 20 using HSR (HSR VLAN) and VLAN 101 using DLR (DLR VLAN). The ringed network as noted above can more generally implement two protocols selected from HSR, DLR, and MRP.

Figure 1C:
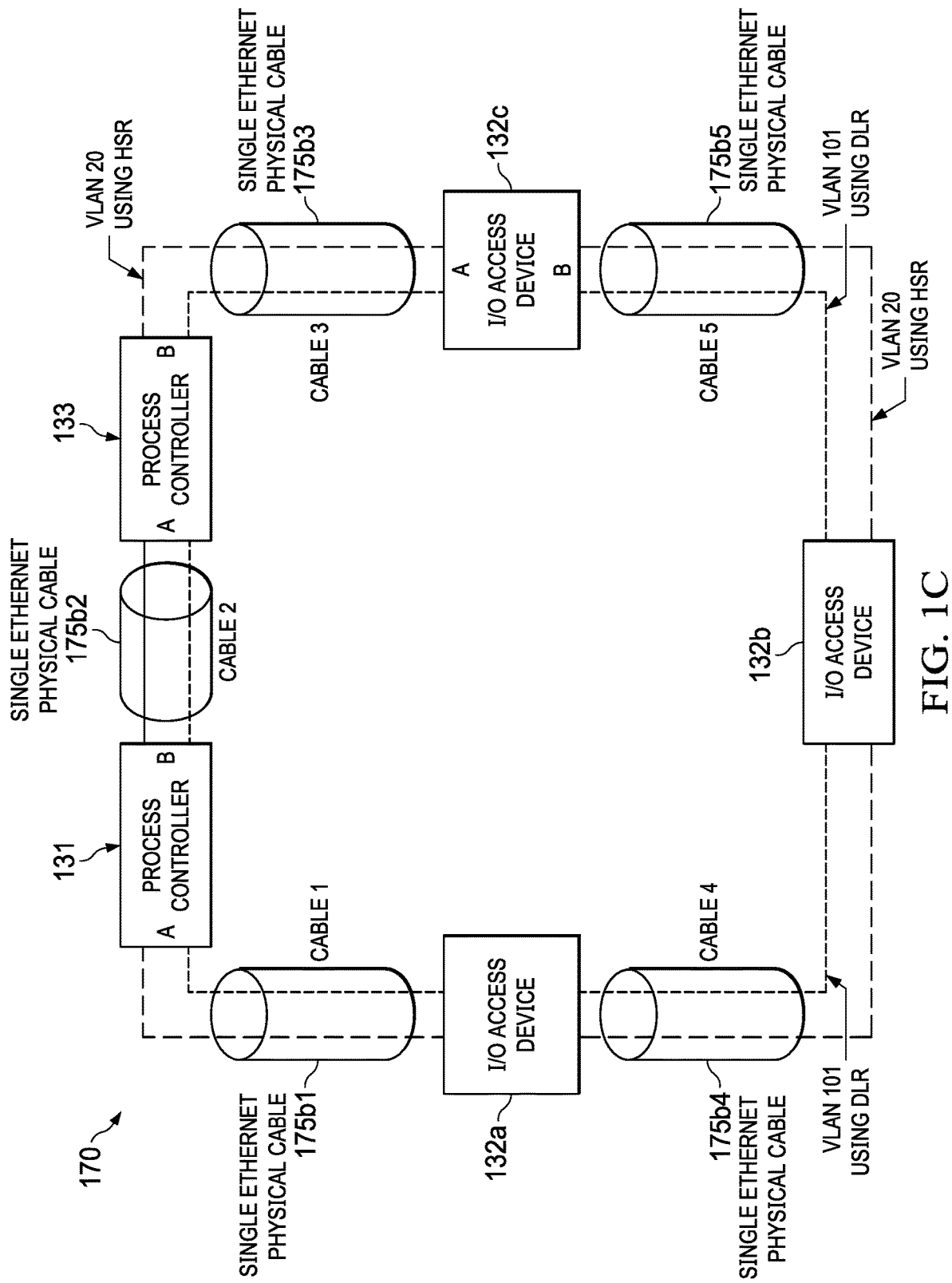
FIG. 1C depicts a disclosed cable connection configured for use in another ringed network that provides multiple network redundancy protocols on the same physical interface for data flows shown between a plurality of nodes, shown as a first and a second process controller, and three I/O access devices, according to an example aspect.

FIG. 1C depicts a disclosed cable connection 170 configured in a ringed network that provides multiple network redundancy protocols shown by example as supporting both VLAN 20 using HSR and VLAN 101 using DLR on the same physical interface (cables) for data flows shown between a plurality of nodes, according to an example aspect. The cable connection 170 as shown includes five single Ethernet physical cables shown as 175*b*1, 175*b*2, 175*b*3, 175*b*4, and 175*b*5, with the cables depicted in FIG. 1B as being cylinders. The nodes in the network are the first process controller 131, second process controller 133, and there are three instances of I/O access devices shown as I/O access device 132*a*, I/O access device 132*b*, and I/O access device 132*c*.

Each process controller comprising the first process controller 131, and the second process controller 133 thus has two cables with cable 2 175*b*2 connecting to the second process controller 133 and cable 1 175*b*1 connecting to the I/O access device 132*a*. The second process controller 133 has two cables (cable 2 175*b*1 connecting to the first process controller 131 and cable 3 175*b*3 connecting to I/O access device 132*c*. Cable 4 175*b*4 and cable 5 175*b*5 are two independent cables that are not connected to any process controller. Cable 4 175*b*4 connects I/O access device 132*a* to I/O access device 132*b*. Likewise, cable 5 175*b*5 connects I/O access device 132*b* and I/O access device 132*c*.

FTE and PRP are example network level redundant protocols to choose from on each created VLAN. Moreover, by utilizing separate VLANs, data security can also be automatically enabled on VLANs with critical communication without any need for additional user configuration. VLAN 20 communication is shown encrypted through the security lock 118 shown in FIG. 1A which represents data security through use of authentication and encryption, between nodes.

The Ethernet frames are generally sent in data packets, such as being IEEE 802.3 compliant frames, and the send and receive for the critical traffic is, for example, implemented over VLAN 20, where the packet being designated as critical or normal traffic can be based on applied network tags representations applied (generally being user configured) to all the nodes in the network, and a plurality of switches if also present in the network. For example, in the case of VLAN there will be a separate VLAN tag for each of the redundant protocols, that functions to redirect to the transmit on both (or parallel redundancy protocol route). From there, the packet can be transmitted on all available cable paths.

The method can thus further comprising configuring with tag representations, generally by a network user all devices in the network including at least a process controller and a second node that can comprise an I/O access device or another device, and if there switches in the communications network also each of the plurality of switches, comprising a first tag representation for a first redundant protocol (such as PRP) and a second tag representation for the second redundant protocol (such as for fault-tolerant ethernet), where the tag representations will be from 1 to 4095 for 12 bits, with the tag representations as a field in the packets transmitted/ sent by the nodes. More generally there will be a separate numerical representation for each redundant protocol, such as three representations for three different redundant protocols. A valid value range for the tag representations is generally set by number of bits used for the tag representations in the packets used by the network. The number of bits being fixed at 12 bits is based on the industry standard 802.1Q. The first and second tag representations are for the simultaneously communicating by directing a dataflow in the cable connection through selecting between the first redundant protocol and the second redundant protocol.

FIG. 2 depicts packet handling (sends) for critical traffic using PRP protocol that runs in the process controller(s) and in I/O access devices such as gateway devices. In FIG. 2 through FIG. 5, 'PHY' shown refers to physical cables, such as Ethernet cables. I buy is no you Shown is an IP stack 205 that applies its configured VLAN tag representations (one tag representation for each redundant protocol) to a data packet handed over to the block shown as team driver block 215 that includes send logic 215c, PRP block 215a, and FTE block 215b, where the logic from the send logic 215c is provided to the PRP block 215a. As noted above the send logic 215c can be implemented by code stored in the memory of the node or by hardware logic. PHY1 corresponds to a first network represented by connection to one physical cable and PHY2 represents the second network by connection to a second physical cable.

There is a solid line shown from PRP 215a to the gigabit media access control (GMAC) shown as GMAC1 220 and GMAC2 221, where GMAC1 220 and GMAC2 221 each represent connectivity to one physical cable, which represents the selected packet path. GMAC 1 220 associated with PHY1 connects to for example switch 105a1 using cable 105b1 as shown in FIG. 1A. GMAC 2 221 associated with PHY2 connects to for example switch 105a2 using cable 105b2 shown in FIG. 1A. Supported is also a PRP redundant protocol using both GMACs 220 and 221 which thus enables connection to cable 105b1 and two cable 105b2. Also supported is an FTE redundant protocol using one of the GMACs 220 and 221 at a time, thus being one of cable 105b1 and cable 105b2, but not both at the same time.

The packets for critical traffic arrive on both available paths (lane 1 and lane 2) and will be redirected to the duplicate packet detection logic, such as PRP-based on a VLAN tag representation indicating PRP, or an ethernet-based duplicate packet detection logic in the case of the VLAN tag representation indicating fault-tolerant ethernet. In either the PRP or the ethernet case, the duplicate packets can be discarded so that a single packet can flow through up to the IP stack of the device.

FIG. 3 depicts packet handing (receives) for critical traffic, where the solid line from GMAC1 220 to receive logic 215d represents the first data packet received on PHY1, and the solid line from GMAC2 221 to receive logic 215d represents the second data packet received on PHY2. As noted above the receive logic 215d can be implemented by code stored in the memory of the node or by hardware logic.

The packets for critical traffic arrive at the node on both available physical networks (PHY1 and PHY2) and will be redirected to the duplicate detection logic such as PRP-based on the tag representation in the packet being identified as PRP. The duplicate packets can be discarded and a single packet will again flow through up to the IP stack 205. In this example, both paths are again selected. As disclosed above, on the receive side, a packet received on PHY1 is matched against a packet received on PHY2 and the redundant packet is discarded. This is the key logic executed based on tag representation identification upfront, and is different logic applied as compared to that on the sending end. Accordingly, the change in data direction in FIG. 3 relative to FIG. 2 is representative of selection of PRP logic for execution and duplicate discarding based on the VLAN tag representation indicating PRP.

Figure 4:
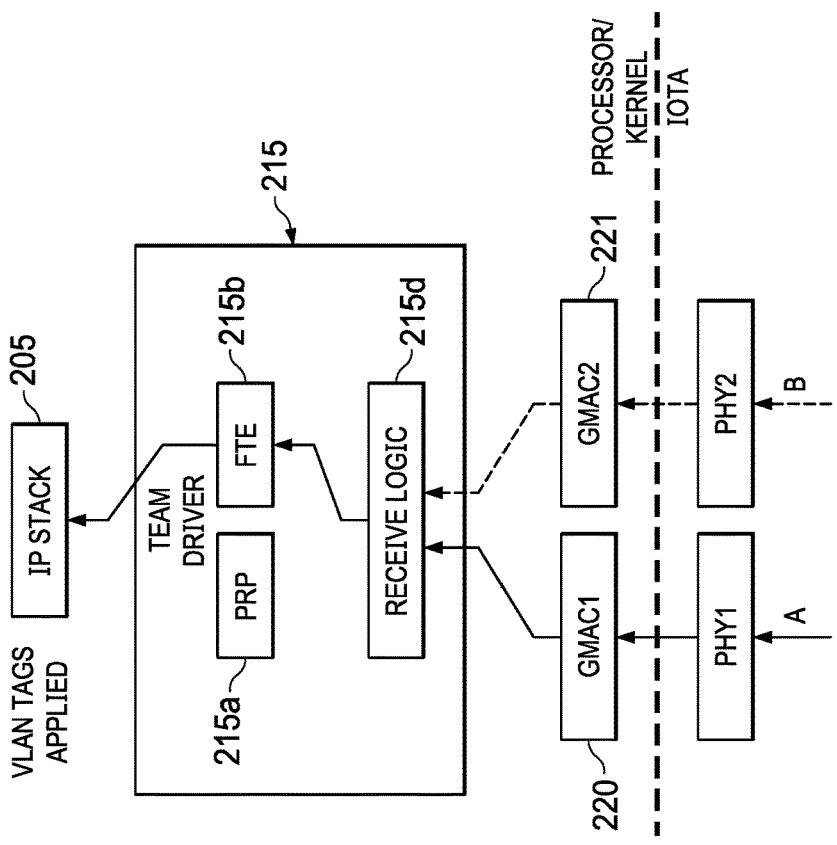
FIG. 4 depicts packet handling (sends) in a non-ringed network for normal (non-critical) traffic is, according to an example aspect.

Regarding packet send/receive for normal traffic, packet sends for normal traffic can be redirected based on applied VLAN tag representation to the FTE 215b shown in FIG. 4. The FTE 215b transmits on the best available path. Two nodes each coupled to having two cables which may be represented Phy1-A and Phy2-B have four possible paths between each other. An algorithm can be defined to select Phy1-A-Phy1-A, Phy2-B-Phy2-B, Phy1-A-Phy2-B, and Phy2-A-Phy1-B in this order of priority. The dotted line shown in FIG. 4 represents an alternate path the FTE 215b can select should the primary PRP path become unavailable.

FIG. 4 shows packet handling (sends) for normal traffic. The solid line represents the selected path. The dotted line represents a backup path when the solid path is unavailable. In this example, FTE 215b to GMAC1 220 on Phy1 is selected with FTE 215b to GMAC 2 221 while Phy2 is used as backup, where GMAC1 220 is again associated with PHY1, while GMAC2 221 is again associated with PHY2.

Figure 5:
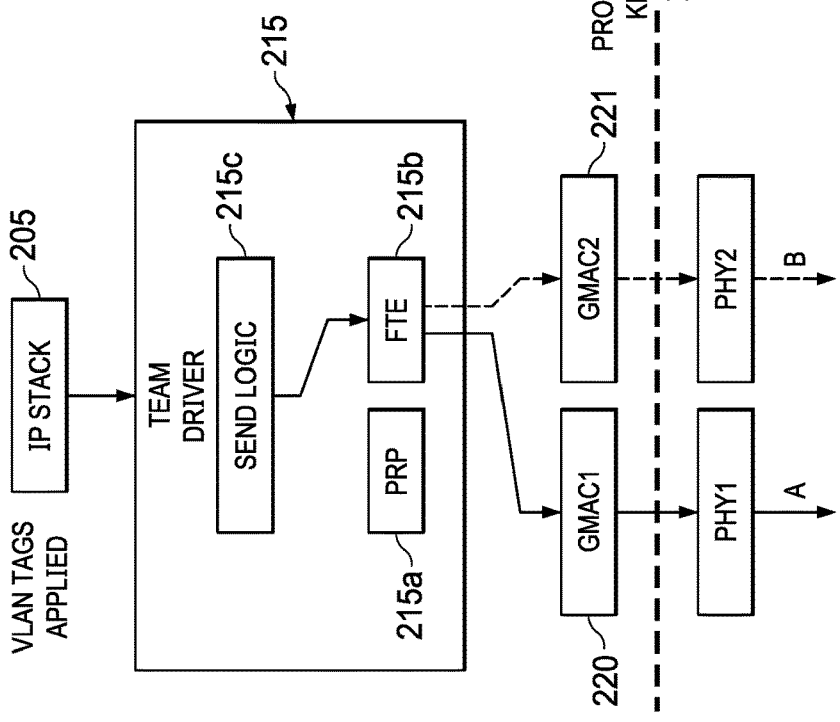
FIG. 5 depicts packet handling (receives) in a non-ringed network for normal (non-critical) traffic.

FIG. 5 depicts packet handling (receives) in a non-ringed network for normal traffic. Packets for normal traffic can arrive on only one of the available paths which can be redirected to the FTE 215b based on the VLAN tag representation representing FTE. The dotted line in FIG. 5 shows an alternate path the packet may arrive to the end devices which can be as described above the first controller 131, I/O access device 132, or second controller 133. As noted above, the logic provided is generally run by the processor 107 in each node.

Disclosed aspects also include a method of operating a PCS that comprises a first node comprising a process controller and a second node comprising an I/O access device, where the process controller and the I/O access device are communicatively connected by a cable connection. The cable connection comprises a plurality of physical cables including a first cable between the process controller and the I/O access device and a second cable independent from the first cable connected between the process controller and a second node comprising the I/O access device or another device.

There is at least one I/O module coupled to receive an output of the I/O access device, with an output of the I/O module coupled to a field device(s) which is coupled to processing equipment. The process controller and the I/O access device each comprise a processor and a memory that implements send and receive logic (stored code in the memory or hardware logic) for communicating using any of multiple redundancy protocols including a first redundant protocol and a second redundant protocol. The send and receive logic is for configuring the cable connection for simultaneously communicating between the process controller and the second node utilizing both the first redundant protocol and the second redundant protocol.

The first cable and the second cable can be in parallel relative to one another to form a first cable pair, and the cable connection can further comprise a second cable pair comprising a third cable and a fourth cable in parallel to the third cable, wherein the second cable pair is in series with the first cable pair. In this arrangement there generally further comprises a plurality of switches between the first cable pair and the second cable pair so that the cable connection comprises a switched cable connection. In this arrangement, the first redundancy protocol can comprise FTE, and the second redundancy protocol can comprise PRP.

In another arrangement, another device comprises the I/O access device, and the first cable, the second cable, the process controller, and the I/O access device are all connected in a ring. In this arrangement, the first redundancy protocol can comprise HSR, and the second redundancy protocol can comprise DLR or MRP.

The I/O module can comprise a plurality of the I/O modules configured in a Honeywell International Highly Integrated Virtual Environment (HIVE), where the I/O access device is configured so that any of the plurality of I/O modules, or any of their channels when the plurality of I/O modules are multichannel, can be used by the process controller to communicate through. The cable connection can implement tag representations which generally comprise numerical tags, where the source and the criteria for the VLAN tag selections can be user configured for the network, with valid value ranges for the tag representations based on the number of bits allocated, so that for 12-bit representations valid tag representation values are 1 to 4095, for directing a dataflow for implementing the simultaneously communicating.

The cable connection 105 can also include a security lock (described above in FIG. 1 the security lock is shown as 118) which automatically adds encryption to only one of the first redundant protocol and the second redundant protocol (e.g., two VLAN 20 but not VLAN 101) to allow encrypting communication between respective process controllers in the case of two or more process controllers and between a process controller and the I/O access device automatically. In this arrangement, the process controller and the I/O access device can include a manufacturer's certificate (described above in FIG. 1 where the manufacturer's certificate security is shown as 119) for establishing the security lock for only one of the first redundant protocol and the second redundant protocol, such as the manufacturer certificate implemented only on VLAN 20. The manufacturer certificate can be presented by the process controller to an I/O Access device (or vice versa) to establish the subsequent security lock.

With conventional data patterns for PCS, there is a choice between the complexity of having multiple networks versus being limited to one redundancy scheme for network redundancy, and this choice is driven because different network redundancy protocols cannot co-exist on the same physical network. Multiple networks are complex because of activities including planning, duplication of PCS software, managing different switches, and wiring costs. However, conventionally PCS users are forced to come up with either adding additional physical networks on the same devices or following the gateway pattern simply because they need different network redundancy schemes and need to create a dedicated physical network just to support a different redundancy scheme or are satisfied with a single redundancy scheme with its recovery characteristics.

Disclosed aspects provide multiple network redundancy protocols which can be deployed on a disclosed physical network to help achieve multiple benefits of network simplification within a PCS such as implemented as a Distributed Control System (DCS). Additionally, with each node/network device includes an embedding a manufacturer credentials (X.509 manufacturer's certificate as an example), a security policy to automatically encrypt critical traffic can be set up. In order to enable a security policy to authenticate and then allow communication, a need for an identity can be required. This identity, for example, may be established with use of a X.509 certificate which can be embedded into a node as part of node manufacturing. X.509 certificate is an example of credentials to establish trust and authenticate nodes. Encryption of communication allows nodes to confidentially exchange data.

Disclosed physical network architectures overcome the limitations described above in the Summary under the problem solved. Significant benefits of a disclosed physical network include the following:

i) Uniform I/O module accessibility. Regarding uniform accessibility, in traditional connectivity patterns prior to this Disclosure, as described above, I/O modules are dedicated to and accessed by a single process controller. With a disclosed network architecture, I/O modules are not dedicated to a single process controller, and instead can be accessed equally by different process controllers to I/O devices from a plurality of process controllers;

ii) No need for duplication of several functions. By defining a single network segment thus allowing process controllers and I/O access devices to sit on, configuration and time distribution does not need to be duplicated as in conventional network architectures where multiple network segments are needed.

iii) Necessary network segregation. Network segregation can be defined as involving developing and enforcing a ruleset for controlling the communications between specific hosts and services is achieved with minimal configuration and built-in security due to availability of necessary functionality to authenticate and encrypt packets. An identification is needed to authenticate a device which is achieved through its credentials (e.g., X.509 certificate). Confidentiality is another leg of security that is achieved through encryption (shown as security lock 118 in FIG. 1A) and which can generally only be achieved through availability of an ID such as through a manufacturer certificate;

iv) Fault recovery can be based on data flow needs, which are generally critical for I/O Module access, and normal for the traffic needs of other device types in the PCS.

Examples

Disclosed aspects are further illustrated by the following specific Examples, which should not be construed as limiting the scope or content of this Disclosure in any way.

Table 1 shown below depicts an example manner in which disclosed network traffic policies can be set up. In this example, there are three different tag representations shown as VLAN IDs, with the critical communication corresponding to the VLAN ID 20 that can utilize PRP, while normal communication corresponding to VLAN ID 101 can utilize FTE, where the traffic policy is set by the VLAN ID. VLAN IDs are only one example representation to set the traffic policy. Other example methods of representation include internal firewalls, access control lists, and micro-segmentation. VLAN IDs are thus only an example of tag representations for setting the traffic policy by selecting between two or more redundant protocols.

TABLE 1

Example of Network Traffic Policy for Data Packets

| VLAN ID | Traffic Policy |
|---|---|
| 101 | Normal |
| 20 | Critical |
| 10 | Normal |

TABLE 2

Example of Network Redundancy protocols for different network Traffic Policies shown as critical and normal

| Traffic Policy | Network Level Redundancy Scheme |
|---|---|
| Critical | Parallel Redundancy Protocol (PRP) |
| Normal | Fault Tolerant Ethernet (FTE) |

While various disclosed aspects have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of operating a process control system (PCS), comprising:
providing the PCS comprising:
a communication network comprising a first node comprising a process controller and a second node comprising an input/output (I/O) access device, wherein the process controller and the I/O access device are communicatively connected by a cable connection, wherein the cable connection comprises:
a plurality of physical cables including a first cable between the process controller and the I/O access device and a second cable independent from the first cable connected between the process controller and the second node comprising the I/O access device or another device,
wherein the process controller and the I/O access device each comprise a processor and a memory that implement send and receive logic for communicating using any of multiple redundancy protocols including a first redundant protocol and a second redundant protocol, and
simultaneously communicating using the cable connection between the process controller and the second node utilizing both the first redundant protocol and the second redundant protocol, wherein:
at least one I/O module in the communication network is coupled to receive an output of the I/O access device,
the at least one I/O module is coupled to a field device which is coupled to processing equipment,
the first redundant protocol is implemented for critical communication and the second redundant protocol is implemented for normal communication, for the simultaneous communication, by utilizing the first cable and the second cable, and
the process controller, the I/O access device, and plurality of switches, each implement two separate virtual local area networks (VLANs) as a first VLAN and a second VLAN, wherein the first VLAN is used for the critical communication and the second VLAN is used for the normal communication simultaneously, wherein the two separate VLANs implemented to segregate data communications for different data flows across the two separate VLANs.

2. The method of claim 1, wherein the first cable and the second cable are in parallel to one another to provide a first cable pair, further comprising a second cable pair comprising a third cable and a fourth cable in parallel to the third cable, wherein the second cable pair is in series with the first cable pair, further comprising a plurality of switches between the first cable pair and the second cable pair so that the cable connection comprises a switched cable connection.

3. The method of claim 2, wherein the first redundancy protocol comprises a fault tolerant ethernet protocol, and wherein the second redundancy protocol comprises a parallel redundancy protocol (PRP).

4. The method of claim 1, wherein another device comprises the I/O access device, and wherein the first cable, the second cable, the process controller, and the I/O access device are connected in a ring.

5. The method of claim 4, wherein the first redundancy protocol comprises High-availability Seamless Redundancy (HSR), and wherein the second redundancy protocol comprises DLR (Device level Ring networks) or MRP (Media Redundancy Protocol).

6. The method of claim 1, wherein the I/O access device is configured such that the process controller may communicate through the at least one I/O module.

7. The method of claim 1, further comprising configuring the process controller and the second node with a first tag representation for the first redundant protocol and a second tag representation for the second redundant protocol, the first and second tag representations for insertion as a field into a packet for transmission for the simultaneously communicating implementing directing a dataflow in the cable connection by selecting between the first redundant protocol and the second redundant protocol.

8. The method of claim 1, wherein the cable connection includes a security lock which automatically adds encryption to only one of the first redundant protocol and the second redundant protocol.

9. The method of claim 8, wherein the process controller and the I/O access device include a manufacturer certificate for establishing the security lock.

10. A process control system (PCS), comprising:
a communication network comprising a cable connection including a plurality of physical cables including a first cable for connecting between a process controller and an I/O access device, and a second cable independent from the first cable for connecting between the process controller and a second node comprising the I/O access device or another device, the I/O access device coupling to at least one I/O module that is coupled to receive an output of the I/O access device, with an output of the I/O module coupled to a field device which is coupled to processing equipment, wherein the process controller and the I/O access device each comprise a processor and a memory that implements a send and receive logic for communicating using any of multiple redundancy protocols including a first redundant protocol and a second redundant protocol, wherein the send and receive logic is for configuring the cable connection for supporting simultaneously communicating between the process controller and the second node utilizing both the first redundant protocol and the second redundant protocol, the first redundant protocol is implemented for critical communication and the second redundant protocol is implemented for normal communication, for the simultaneous communication, by utilizing the first cable and the second cable, and the process controller, the I/O access device, and plurality of switches, each implement two separate virtual local area networks (VLANs) as a first VLAN and a second VLAN, wherein the first VLAN is used for the critical communication and the second VLAN is used for the normal communication simultaneously, wherein the two separate VLANs implemented to segregate data communications for different data flows across the two separate VLANs.

11. The PCS of claim 10, wherein the first cable and the second cable are in parallel to one another to provide a first cable pair, further comprising a second cable pair comprising a third cable and a fourth cable in parallel to the third cable, wherein the second cable pair is in series with the first cable pair, further comprising a plurality of switches between the first cable pair and the second cable pair so that the cable connection comprises a switched cable connection.

12. The PCS of claim 11, wherein the first redundancy protocol comprises a fault tolerant ethernet protocol, and wherein the second redundancy protocol comprises a parallel redundancy protocol (PRP).

13. The PCS of claim 10, wherein another device comprises the I/O access device, and wherein the first cable, the second cable, the process controller, and the I/O access device are connected in a ring.

14. The PCS of claim 13, wherein the first redundancy protocol comprises High-availability Seamless Redundancy (HSR), and wherein the second redundancy protocol comprises DLR (Device level Ring networks) or MRP (Media Redundancy Protocol).

15. The PCS of claim 10, wherein the I/O access device is configured such that the process controller may communicate through the at least one I/O module.

16. The PCS of claim 10, wherein the communications network implements a first tag representation for the first redundant protocol and a second tag representations for the second redundant protocol configured at the process controller and the second node, the first and second tag representations for the simultaneously communicating implementing directing a dataflow in the cable connection by selecting between the first redundant protocol and the second redundant protocol.

17. The PCS claim 10, wherein the cable connection includes a security lock which automatically adds encryption to only one of the first redundant protocol and the second redundant protocol.

18. The PCS of claim 17, the I/O access device comprises a gateway device or an interface module.

19. The PCS of claim 10, wherein the send and receive logic both comprise code stored in the memory.

20. The PCS of claim 10, wherein the send and receive logic both comprise hardware logic.

* * * * *